Figure 1:
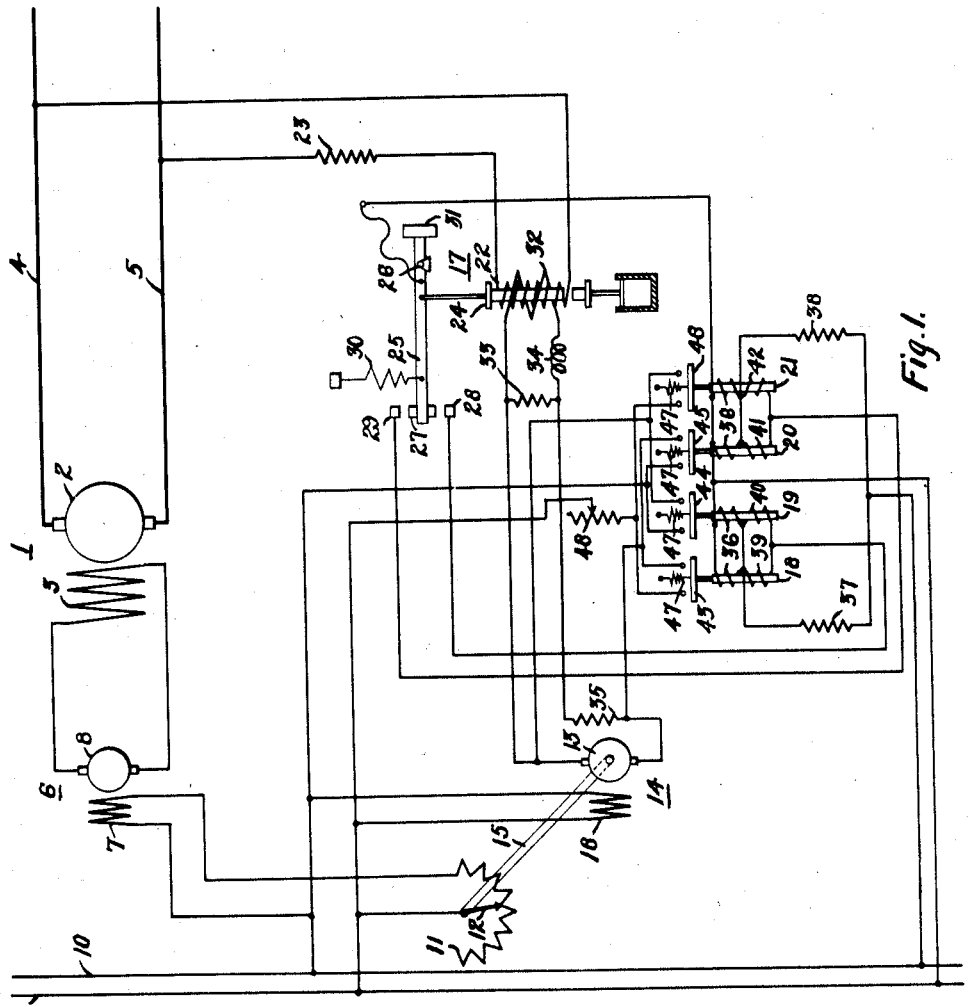

Oct. 16, 1923.

C. A. BODDIE ET AL 1,470,681

REGULATOR SYSTEM

Filed Aug. 10, 1918.

WITNESSES:
Ed. V. Herron
W. B. Wells.

INVENTORS
Clarence A. Boddie
Roswell E. Cullings
BY
ATTORNEY

Patented Oct. 16, 1923.

1,470,681

UNITED STATES PATENT OFFICE.

CLARENCE A. BODDIE, OF PITTSBURGH, AND ROSWELL E. CULLINGS, OF WILKINSBURG, PENNSYLVANIA, ASSIGNORS TO WESTINGHOUSE ELECTRIC & MANUFACTURING COMPANY, A CORPORATION OF PENNSYLVANIA.

REGULATOR SYSTEM.

Application filed August 10, 1918. Serial No. 249,325.

*To all whom it may concern:*

Be it known that we, CLARENCE A. BODDIE, a citizen of the United States, and a resident of Pittsburgh, in the county of Allegheny and State of Pennsylvania, and ROSWELL E. CULLINGS, a citizen of the United States, and a resident of Wilkinsburg, in the county of Allegheny and State of Pennsylvania, have invented a new and useful Improvement in Regulator Systems, of which the following is a specification.

Our invention relates to electrical regulator systems and particularly to regulator systems wherein the regulation of supply circuits is effected by an adjustment of the field excitation of the generators which are connected to such supply circuits.

One object of our invention is to provide an electric regulator of large capacity that shall be simple and economical in construction and shall maintain a substantially constant voltage in a supply circuit in a steady and reliable manner without an excessive hunting action.

More specifically, our invention embodies a generator connected to a supply circuit, a rheostat for varying the excitation of the generator, a motor for adjusting the rheostat, a main control magnet operated in accordance with supply-circuit conditions for governing the operation of the motor, and means for preventing a hunting action by the magnet and for effecting a quick stopping of the motor when it is disconnected from a source of power.

In regulators of the above-indicated character having a generator connected to a supply circuit and adapted to vary the excitation of the generator for maintaining a constant voltage in a supply circuit, it is necessary to provide an anti-hunting device in order to obtain satisfactory operation of the regulator. In a system provided with a main magnet governed in accordance with the voltage obtaining in a supply circuit and serving to control the operation of a motor and a rheostat for varying the excitation of the generator, some means must be provided to prevent the momentum of the moving parts of the regulator from over or under compensating for the voltage changes. Some means should be provided for stopping the operation of the motor and the movement of the rheostat arm prior to the obtaining of normal voltage in the supply circuit in order to prevent the momentum of the moving parts and the inertia of the system from over-compensating for the voltage change.

In a regulator system constructed in accordance with our invention, the setting or adjustment of the main control magnet is changed a small amount upon operation of it in a manner to oppose the operation of the magnet which was caused by the change of voltage in the supply circuit. Consequently, the motor, which operates the generator rheostat, is operated at full speed until the supply circuit is within a small per cent of normal voltage and then the magnet operates to de-energize the motor and prevent further change in the excitation of the generator. Thus, the momentum of the moving parts does not over-compensate for the voltage change in the supply circuit but assists in obtaining a voltage in the supply circuit within a small per cent of normal value. Subsequently, the magnet is operated in a step-by-step manner until normal voltage is obtained.

Our invention is particularly adapted for service on electric locomotives to maintain a constant-voltage on the main propelling motors preliminary to regenerative operation. However, our regulator is in no way limited for service on electric locomotives but may be utilized in many other instances where constant voltage is desired.

Figure 2:
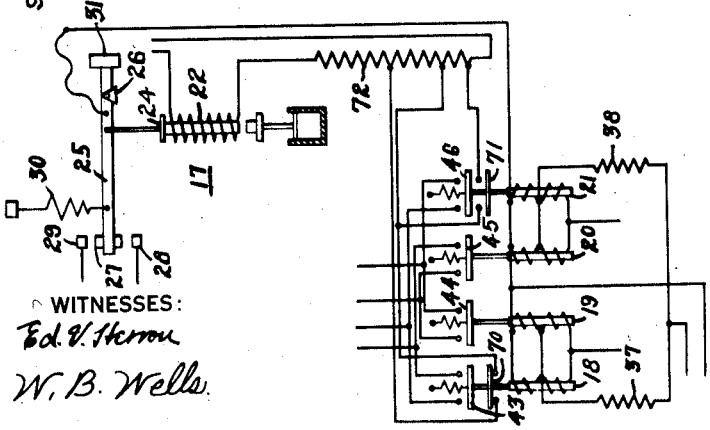

In the accompanying drawing, Fig. 1 is a diagrammatic view of a regulator system embodying our invention, and Fig. 2 is a diagrammatic view of a portion of a modified system.

Referring to Fig. 1 of the drawing, a generator 1, embodying an armature 2 and a field winding 3, is connected to a supply circuit comprising conductors 4 and 5. An auxiliary exciting generator 6, comprising a field winding 7 and an armature 8, is provided for energizing the field windings 3. The field winding 7 of the auxiliary exciting generator is connected, through a rheostat 11, to an auxiliary supply circuit which embodies conductors 9 and 10. The rheostat 11 is automatically adjusted, in a manner to be hereinafter set forth, in accordance with the voltage obtaining in the supply circuit comprising the conductors 4 and 5.

A contact arm 12 of the rheostat 11 is connected to the armature 13 of a motor 14 in any suitable manner, as by means of a shaft 15. The motor 14 is provided with a field winding 16 which is connected across the auxiliary supply circuit comprising conductors 9 and 10. The operation of the motor 14 is controlled by means of a relay 17 and four switches 18, 19, 20 and 21.

The main control magnet 17 embodies an energizing winding 22 which is connected across the supply conductors 4 and 5 through a resistor 23. The winding 22 attracts an armature 24 that is pivotally suspended from a contact arm 25 which is pivotally mounted at a point 26. The contact arm 25 is provided with a contact member 27 which is adapted to engage either a contact member 28 or a contact member 29, according to the degree of energization of the winding 22 of the magnet. A coil spring 30 is attached to the contact arm 25 for opposing the action of the winding 22, and a weight 31 is mounted on the contact arm for counter-balancing a portion of the weight of the armature and of the contact members. The magnet 17 is provided with a second winding 32 that is connected across the armature 13 and serves to prevent a hunting action by the magnet. A resistor 33 is connected across the winding 32 in order to limit the amount of current flowing therethrough, and an inductance 34 is provided in series with the winding 32 in order to effect a time lag in the action thereof, and thereby prevent chattering action of the regulating mechanism. A resistor 35, which serves for electric braking of the motor 13, is also inserted in the circuit of the winding 32.

The switches 18 to 21, inclusive, respectively embody windings 36, which are connected, through the resistors 37 and 38, across the supply conductors 9 and 10, and windings 39, 40, 41 and 42 which are differentially wound with respect to the windings 36 and are selectively energized by means of the relay 17. The switches 18 to 21, inclusive, are also provided with contact members 43 to 46, inclusive, which selectively control the direction of rotation of the motor 14. It will be noted that the switches 18 to 21, inclusive, are maintained in an open position by means of the constantly energized coils 36 and are operated by energizing the windings 39 to 42, inclusive, which oppose the action of the coils 36 and permit the closing of the switches by springs 47. A regulating resistor 48 is preferably inserted in the circuit of the motor 14.

The operation of our system, in maintaining a constant voltage in the supply conductors 4 and 5, may be best shown by following through the regulator system the effect of fluctuations in voltage of the supply circuit.

Assuming the contact member 27 to be in the position shown in the drawing, under normal voltage conditions in the supply circuit, then an increased voltage in the supply conductors 4 and 5 will increase the strength of the winding 22 to overcome the action of the spring 30 and connect the contact members 27 and 28. When the contact member 27 engages the contact member 28, a circuit is completed from the auxiliary supply conductor 9 through the contact arm 25, contact members 27 and 28, windings 39 and 40 of the switches 18 and 19, and resistor 37 to the auxiliary supply conductor 10. The switches 18 and 19 are operated and a circuit is completed from the supply conductor 9 through the resistor 48, switch member 43, armature 13 and the switch member 44 to the auxiliary supply conductor 10. The motor 14 is operated to rotate in a clockwise direction in order to rotate the contact arm 12 of the rheostat 11 in a manner to increase the amount of resistance included in the field windings 7 of the exciting generator 6. Thus, the voltage of the exciting generator 6 is reduced, which, in turn, reduces the voltage of the generator 1 and the supply conductors 4 and 5. It will be noted that the anti-hunting winding 32 of the magnet 17 is connected in circuit with the armature 13 of the motor 14 and is energized in accordance with the operation of the motor.

In case the voltage of the supply conductors 4 and 5 falls below normal value, the relay 17 is operated to effect engagement of the contact members 27 and 29 and thus complete a circuit from the auxiliary supply conductors 9 and 10 through the differential coils 41 and 42 of the switches 20 and 21. The switches 20 and 21 are operated to complete a circuit through the armature 13 of the motor 14 that extends from the supply conductor 9 through the resistor 48, switch member 46, armature 13 and the switch member 45 to the auxiliary supply conductor 10. The armature 13 is thus connected across the auxiliary supply conductors 9 and 10 by means of the switches 20 and 21, but in a manner to reverse the flow of current therethrough and effect rotation of the motor 14 in a counter-clockwise direction so as to reduce the resistance included in the field winding 7. Thus, the voltage of the exciting generator 6 is increased, which, in turn, effects an increase in the voltage of the generator 1 and the supply conductors 4 and 5.

Thus, it is apparent that an increase in voltage of the supply conductors 4 and 5 operates the switches 18 and 19 for rotating the motor 14 and the rheostat arm in a clockwise direction for decreasing the voltage of the generator 1, and a reduction of the voltage in the supply conductors 4 and 5 effects operation of the switches 20 and 21 for rotating the motor 14 and the rheostat arm 12 in a counter-clockwise direction to increase the voltage of the generator 1.

Referring to the modification of our invention illustrated in Fig. 2 of the drawing, the switches 18 and 21 are respectively provided with interlock switch members 70 and 71 for varying the value of a resistor 72, which is included in the circuit of the main control magnet 17. The auxiliary winding 32, which is illustrated in Fig. 1 of the drawing, is dispensed with and the change in the setting or adjustment of the magnet 17 is accomplished solely by the relays 18 and 21 which vary the value of the resistor 72.

In case the magnet 17 is subjected to voltage above the normal supply-circuit voltage, the interlock switch 70 is operated by the switch 18 to increase the value of the resistor 72 included in the circuit of the winding 32, and, in a like manner, the interlock switch 71 is operated by the switch 21 to decrease the value of the resistor 72 when the magnet 17 is subjected to a voltage below the normal supply-circuit voltage. Thus, it is apparent that the value of the resistor 72 is varied by the interlock switches 70 and 71 to perform the same function as the winding 32 and thus prevent a hunting action by the regulator.

Modifications in the system and arrangement and location of parts may be made within the spirit and scope of our invention, and such modifications are intended to be covered by the appended claims.

We claim as our invention:

1. In a regulator for a supply circuit, a main control magnet operated in accordance with supply-circuit conditions, a resistor, means governed by said magnet for controlling said resistor, an auxiliary winding associated with said magnet, an inductance element in circuit with said winding, and means for varying the direction of current flow in the auxiliary winding to prevent hunting action.

2. In a voltage regulator, a motor to be controlled, a resistor adapted to be varied in accordance with the operation of said motor, an electromagnet for controlling the operation of said motor and having a main winding and an auxiliary winding, said main winding being energized in accordance with the voltage of a supply circuit, means for preventing hunting action comprising means for governing the direction of current flow in said auxiliary winding and means for delaying the action of said means for preventing hunting action.

3. In a voltage regulator for a supply circuit, a main control magnet operated in accordance with the voltage of the circuit, a motor operated in a forward and in a reverse direction by said magnet, means controlled by said motor for varying the voltage of the supply circuit, means comprising a winding energized in accordance with the direction of rotation of the motor for varying the operation of said magnet to prevent hunting action, and an inductance element in circuit therewith.

4. In a voltage regulator, a main control magnet energized in accordance with the voltage obtaining in a supply circuit, a resistor, a motor operated in accordance with the position of the magnet for adjusting said resistor, a winding connected across the motor armature circuit and associated with the magnet to prevent hunting action thereby, and means for delaying the effective energization of said winding.

5. In a regulator for a supply circuit, a main control magnet energized in accordance with supply-circuit conditions, a motor, means for rotating the motor in accordance with the position of the magnet, a winding connected to the armature circuit of the motor and associated with the magnet to prevent hunting action thereby, and an inductance member in the circuit of said winding for producing a time lag in the energization thereof.

6. In a voltage regulator for a supply circuit, a motor, a main control magnet, means for rotating the motor in accordance with the position of said magnet, means connected in the armature circuit of the motor for preventing hunting action by the magnet, means for delaying the operation thereof, and means for effecting a quick stop of the motor when it is de-energized.

7. The combination with a generator, an adjustable resistor for varying the excitation of said generator, and a motor for adjusting said resistor, of means comprising a regulator for operating said motor in a forward and in a reverse direction in accordance with the voltage of the generator circuit, means comprising a winding connected to the armature circuit of said motor for varying the operation of the regulator to prevent hunting action thereby, and means for delaying the action thereof.

8. The combination with a supply circuit, a main control magnet connected across the supply circuit, an electric motor, and means controlled by said magnet for varying the direction of rotation of the motor, of means controlled by said motor for varying the voltage of the supply circuit, an auxiliary winding associated with said magnet and energized in accordance with the direction of rotation of the motor for preventing hunting action, and an inductance element in circuit therewith.

9. The combination with a main generator, an exciter generator for energizing the field windings of the main generator, a rheostat in the circuit of the exciter field windings, and a motor for governing the operation of said rheostat, or a regulator comprising a main control magnet for governing the operation of said motor in accordance with the voltage supplied by the main generator, means governed by the armature circuit of said motor for varying the setting of the magnet upon each operation by it to prevent hunting action, and means for preventing chattering action of said regulator.

10. The combination with a generator, means comprising a rheostat for governing the excitation of the generator, and a motor for operating the rheostat, of a regulator for operating said motor in accordance with the voltage of the generator circuit, and comprising a winding energized in accordance with the operation of the motor for varying the setting of the regulator at each operation thereof to prevent hunting action by said regulator, and means for delaying the effective energization of said winding.

11. In a voltage regulator for a supply circuit, the combination with a main control magnet connected across the supply circuit, a motor controlled by said magnet, and a rheostat operated by the motor for varying the supply-circuit voltage, of means comprising a single winding energized in accordance with the operation of the motor for varying the setting of the magnet to prevent hunting action, and means for delaying the energization of said winding.

12. In a regulator for a supply circuit, a main control magnet having a core and a main winding energized in accordance with supply circuit conditions, an auxiliary winding also acting upon said core to prevent hunting action of the regulator, and means in circuit with said auxiliary winding to delay the action thereof.

13. In a regulator for a supply circuit, a main control magnet having a main winding energized in accordance with supply circuit conditions, an auxiliary winding cooperating with said magnet to prevent hunting action and an inductance member in circuit with said auxiliary winding for producing a time lag in the energization thereof.

14. In a voltage regulator for a supply circuit, electroresponsive means having a voltage winding connected across said circuit and a current winding, a source of energization for said current winding, means in circuit with said current winding for introducing a time element in the energization thereof, and means for adjusting the degree of energization of said current winding.

15. In a regulator, a main control magnet energized in accordance with the conditions of a circuit connected thereto, an independently energized winding for overcoming the initial movement of said magnet, and means for introducing a time element in the energization of said second-mentioned winding, and means for adjusting the degree of energization thereof.

In testimony whereof, we have hereunto subscribed our names this 31st day of July, 1918.

CLARENCE A. BODDIE.
ROSWELL E. CULLINGS.